United States Patent
Heiles et al.

(10) Patent No.: US 7,013,059 B2
(45) Date of Patent: Mar. 14, 2006

(54) METHODS FOR PROTECTING DATA SIGNALS WHICH ARE BEING TRANSMITTED VIA OPTICAL CONDUCTORS

(75) Inventors: Juergen Heiles, Munich (DE); Oliver Jahreis, Munich (DE); Hubert A. Jaeger, McLean, VA (US); Alfons Mittermaier, Berlin (DE)

(73) Assignee: Siemens Aktiengesellschaft, Munich (DE)

( * ) Notice: Subject to any disclaimer, the term of this patent is extended or adjusted under 35 U.S.C. 154(b) by 13 days.

(21) Appl. No.: 10/915,937

(22) Filed: Aug. 10, 2004

(65) Prior Publication Data

US 2005/0013532 A1    Jan. 20, 2005

Related U.S. Application Data

(63) Continuation of application No. 10/136,257, filed on Apr. 30, 2002, now abandoned.

(51) Int. Cl.
*G02B 6/12* (2006.01)

(52) U.S. Cl. .............................. 385/16; 385/17; 385/18
(58) Field of Classification Search ..... 385/16–24,100, 385/105, 115, 130; 398/42, 44, 45
See application file for complete search history.

(56) References Cited

U.S. PATENT DOCUMENTS

| 5,903,370 | A  | * | 5/1999  | Johnson ......................... 398/4 |
| 6,262,820 | B1 | * | 7/2001  | Al-Salameh ................. 398/12 |
| 6,362,905 | B1 | * | 3/2002  | Fukashiro et al. ............ 398/82 |
| 6,375,362 | B1 | * | 4/2002  | Heiles et al. .................. 385/75 |
| 6,583,898 | B1 | * | 6/2003  | Koeppen et al. .............. 398/13 |
| 6,643,422 | B2 | * | 11/2003 | Katagiri et al. ............... 385/16 |

FOREIGN PATENT DOCUMENTS

| DE | 4032658 A1  | * | 4/1992 |
| JP | 56087949 A  | * | 7/1981 |
| JP | 2002062549 A | * | 2/2002 |

* cited by examiner

Primary Examiner—Uyen-Chau N. Le
(74) Attorney, Agent, or Firm—Bell, Boyd & Lloyd LLC

(57) ABSTRACT

Methods for protecting data signals which are being transmitted via optical conductors are disclosed. At least one operational optical conductor set that is connected at both ends to optical switching devices is provided for the purpose of bi-directional transmission of the data signals. A stand-by optical conductor set is also connected at both ends to the optical switching devices. In the event of interference on at least one optical conductor of the operational optical conductor set, such as a signal failure determined at the receiving end, there is a switchover at the receiving end from the respective operational optical conductor set to the stand-by optical conductor set. Consequently, there is a signal failure at the opposite end, and immediately thereupon there is also a similar switchover at the opposite end to the stand-by optical conductor set.

9 Claims, 3 Drawing Sheets

METHODS FOR PROTECTING DATA SIGNALS WHICH ARE BEING TRANSMITTED VIA OPTICAL CONDUCTORS

RELATED APPLICATIONS

This is a continuation application Ser. No. 10/136,257 filed Apr. 30, 2002 now abandoned, incorporated herein in its entirety by reference.

BACKGROUND

The present invention generally pertains to methods of protection or switching data signals being transmitted through optical data networks via optical conductors.

In existing optical data networks, optical data signals with a low bit rate are multiplexed to form data signals with a higher bit rate and are transmitted via the optical data networks. These optical data networks include various optical amplifiers and switching devices.

In order to protect line sections of the optical data networks against failures, stand-by optical conductors, also termed protection lines, are laid in parallel with the operational optical conductors, also termed working lines.

These disjoint, stand-by optical conductors or links protect the operational data signals. Given the presence of more than two disjoint paths, it is economically advantageous when n operational data signals share the alternative route. This prevents 50% of the total transport capacity being reserved for stand-by switchings. Only 1/(n+1)th of the transport capacity has to be reserved for stand-by switchings, owing to the 1:n stand-by switching.

Protection switchings, also termed protection, for optical transmission systems are known from the synchronous digital hierarchy, SDH for short, or the synchronous optical network, SONET for short. A known protection switching is the 1:n or, for the case n=1, the 1:1 stand-by switching. In this case, n optical lines are protected by one stand-by line. Additional data that are no longer transmitted in the event of a fault can be transmitted in the fault-free state on the stand-by line. Data transmitted additionally on the stand-by line are also denoted as low-priority traffic.

A 1:n stand-by switching method, termed 1:n multiplex section protection in accordance with ITU-T G.783, has been standardized for this purpose in SDH technology. What is termed a multiplex section is used in SDH for the purpose of unambiguous fault location. This section forms a multiplex section overhead over the operational data signal and extends precisely over the section of the stand-by switching. In other words, the multiplex section overhead is generated at the transmitting end and terminated at the receiving end, or precisely the reverse in the opposite direction. The multiplex section overhead is therefore not affected by operational data signal interference outside the stand-by switching system. If, for example, interference is determined on the multiplex section at the receiving end, the cause of the interference clearly resides on the section of the multiplex section, and not before it. The same monitoring principle also holds for the alternative route. The multiplex section overhead, which is transmitted with the useful data signal, makes a fast communication channel available for coordinating the stand-by switching. This ensures that both ends are nevertheless switched to stand-by in the event of interference in only one direction, that both ends switch the same operational data signal to stand-by in accordance with a priority scheme in the event of the occurrence of multiple faults, and that the two ends are reset in a quasi-synchronous fashion after the fault clearance.

An automatic protection switching protocol, termed APS for short, is normally used to control this 1:n stand-by switching. This protocol is transmitted in overhead bytes of the optical data signals, for example, what is termed the multiplex section overhead. The protocol overhead may be transmitted overhead with the aid of additional optical channels, such as optical supervisory channels, OSC for short, for example. The protocol is evaluated at the initial point and end point of the transmission. Protection switching is then possible, if necessary, after evaluation of the protocol data.

DWDM network operators offer the SDH or SONET network operators transparent links on the basis of dense wavelength division multiplex technology, DWDM for short. The transparency relates to the SDH or SONET signals, that is to say to payload and overload, thus including the multiplex section overhead. The DWDM network operator can certainly read the multiplex section overhead and thus monitor the signal quality. However, owing to the business model, the network operator is not authorized to modify or terminate the multiplex section overhead. The advantage of this for the SDH network operator is that the operator can use the multiplex section overhead to communicate between his network segments over the DWDM network.

The effects of this on the 1:n stand-by switching are as follows. The multiplex section no longer extends only over the section between two devices to be switched to stand-by (DWDM network operators). It certainly still supplies a criterion for the failure of an operational data signal. However, the fault cause can no longer be located. Because the multiplex section overhead can no longer be used by the DWDM network operator, no communication channel is available for coordinating the 1:n stand-by switching.

Accordingly, there is now no optical additional channel available, or it is not possible to access overhead bytes of the optical data signal. This problem as can also occur in the case of the transmission of data over networks having devices from different manufacturers or over externally administered networks. There is the problem that it is not possible to carry out protection switching with the aid of these APS protocols.

SUMMARY

The present invention generally pertains to methods for protecting data signals which are being transmitted via optical conductors. More specifically, the present invention pertains to methods of switching optical conductors for transmitting optical data signals due to failures in the optical conductors.

In an embodiment of the present invention, a method for protecting data signals is provided. The data signals are transmitted bi-directionally via at least one operational optical conductor set that is connected at both ends to optical switching devices. At least one stand-by optical conductor set, which is likewise connected to the switching devices, used in the method. Also, monitoring and control devices present in the optical switching devices are used in the event of interference to switch over from the respective operational optical conductor set to the stand-by optical conductor set. In the event of interference in at least one optical conductor of an operational optical conductor set, according to the present method, the signal failure is determined at the receiving end, the data signal is switched over at the receiving end to the stand-by optical conductor set, and a similar switchover to the stand-by optical conductor set is performed at the opposite end by the signal failure, thereby produced, on operational optical conductor set. In the event of a failure of a plurality of operational optical conductors, switchover to the stand-by optical conductor set is carried out according to a priority that can be stipulated. Also, priority can be allocated as a function of the temporal occurrence of the interference in the respective operational optical conductors.

In a further embodiment of the invention, the pairs of optical conductors are implemented by bi-directionally used optical conductors.

In yet another embodiment of the invention, the switchover from the stand-by pair of optical conductors to the pair of operational optical conductors that is once again functional is performed by an additional readiness reset command which, after a switchover at one end, effects a quasi-synchronous switchover at the opposite end. One advantage of the present invention is to provide a 1:n or 1:1 stand-by switching for optical links in the case of transmission over optical conductors, without using a protocol.

A feature of the present invention is that a protection switching of at least one pair of operational optical conductors or bi-directionally used operational optical conductors (working lines) is possible by means of at least one stand-by pair of optical conductors or bi-directionally used stand-by optical conductors (protection lines), without using a communication or auxiliary protocol.

A further feature of the present invention is to switch to stand-by in the example only when the fault cause is within the system to be protected, that is to say between two DWDM devices. If switching to stand-by were also performed when the cause of the interference in the operational data signal was outside the stand-by switching system, first the stand-by switching would not deliver any improvement for the operational data signal affected by interference and, second, the alternative route would no longer be available for protecting the other operational data signals. In other words, the 1:n stand-by switching system of the present invention can locate the fault cause by being able to determine whether the fault cause resides inside or outside the stand-by switching system.

Yet another feature of the present invention is in the case of multiple faults, a first operational data signal is not permitted to be connected erroneously in the longer term to a second operational data signal. Therefore, coordination of the stand-by switching activities between the two ends is provided.

After the clearance of the operational data signal interference, the stand-by switching devices switch back quasi-synchronously to the operational path.

In an even further feature, in the event of faults in only one direction, switching to stand-by should nevertheless be carried out in both directions, since during repair work it is usually the case that both directions are separated, at least temporarily.

Additional features of the present invention are described in, and will be apparent from, the following Detailed Description of the Present Embodiments and the figures.

DETAILED DESCRIPTION OF THE PRESENT EMBODIMENTS

Figure 1:
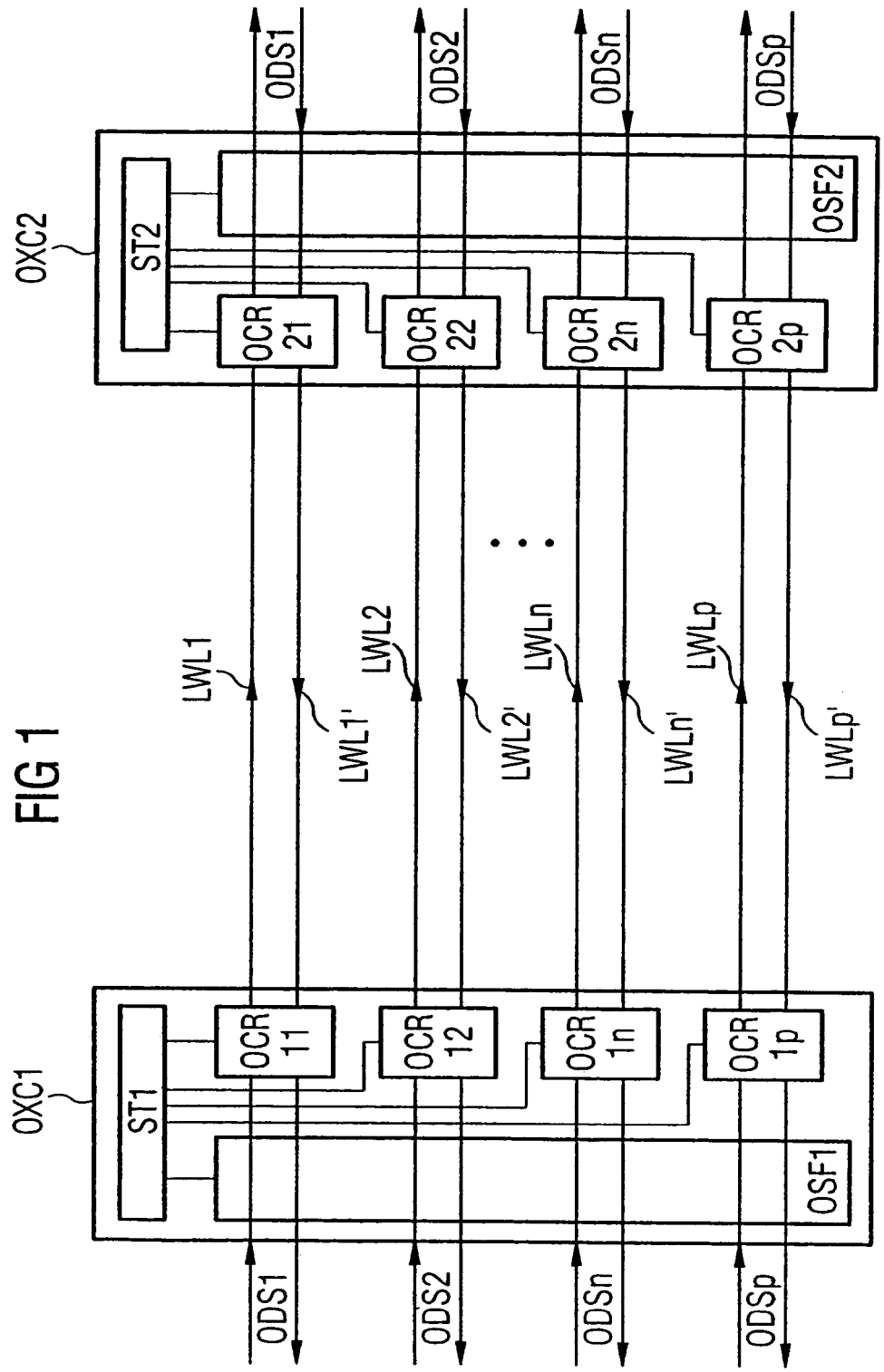
FIG. 1 shows a block diagram of an optical data network arrangement according to the present invention.

FIG. 1 shows the principle of the design of an arrangement according to the invention for an optical data network. The optical data network includes optical conductors LWL1, . . . , LWLn, LWLp, LWL1', . . . , LWLn', LWLp' which are arranged in pairs or a set and optical switching devices OXC1, OXC2 which are provided at both ends. The optical switching devices OXC1, OXC2 have an optical switch panel OSF1, OSF2, respectively, one control device ST1, ST2 each, and monitoring devices OCR11, . . . , OCR1n, OCR1p, OCR21, . . . , OCR2n, OCR2p assigned in each case to a pair or set of optical conductors. The pairs of optical conductors LWL1, LWL1' . . . LWLn, LWLn' form the operational optical conductors or working lines for bi-directional transmission of the optical data signals ODS1, ODS2, . . . , ODSn. The pair of optical conductors LWLp, LWLp' serves as stand-by optical conductors or protection lines for the case in which interference occurs on one of the operational optical conductors LWL1, LWL1' . . . LWLn, LWLn'. It is provided for the case of such interference that the affected operational optical conductor is disconnected at both ends, and the data transmission takes place via the stand-by line LWLp, LWLp' after completion of the switch over.

Each pair of optical conductors LWL1, . . . , LWLn, LWLp, LWL1', . . . , LWLn', LWLp' forms a transmission channel for an optical data signal ODS1, . . . , ODSn, ODSp. In each case, one optical conductor per pair of optical conductors is provided for transmitting the data signals in one direction, and the other optical conductor being provided for transmitting in the opposite direction.

Regenerators, amplifiers, multiplexers, switching elements or other optical devices (not illustrated) can be provided along the optical conductors.

An individual optical conductor for bi-directional transmission of the optical data signals can be used as a set instead of a pair of optical conductors and can be represented in the figures as a pair of conductors as shown to illustrate the bi-directional transmission characteristics.

Figure 2:
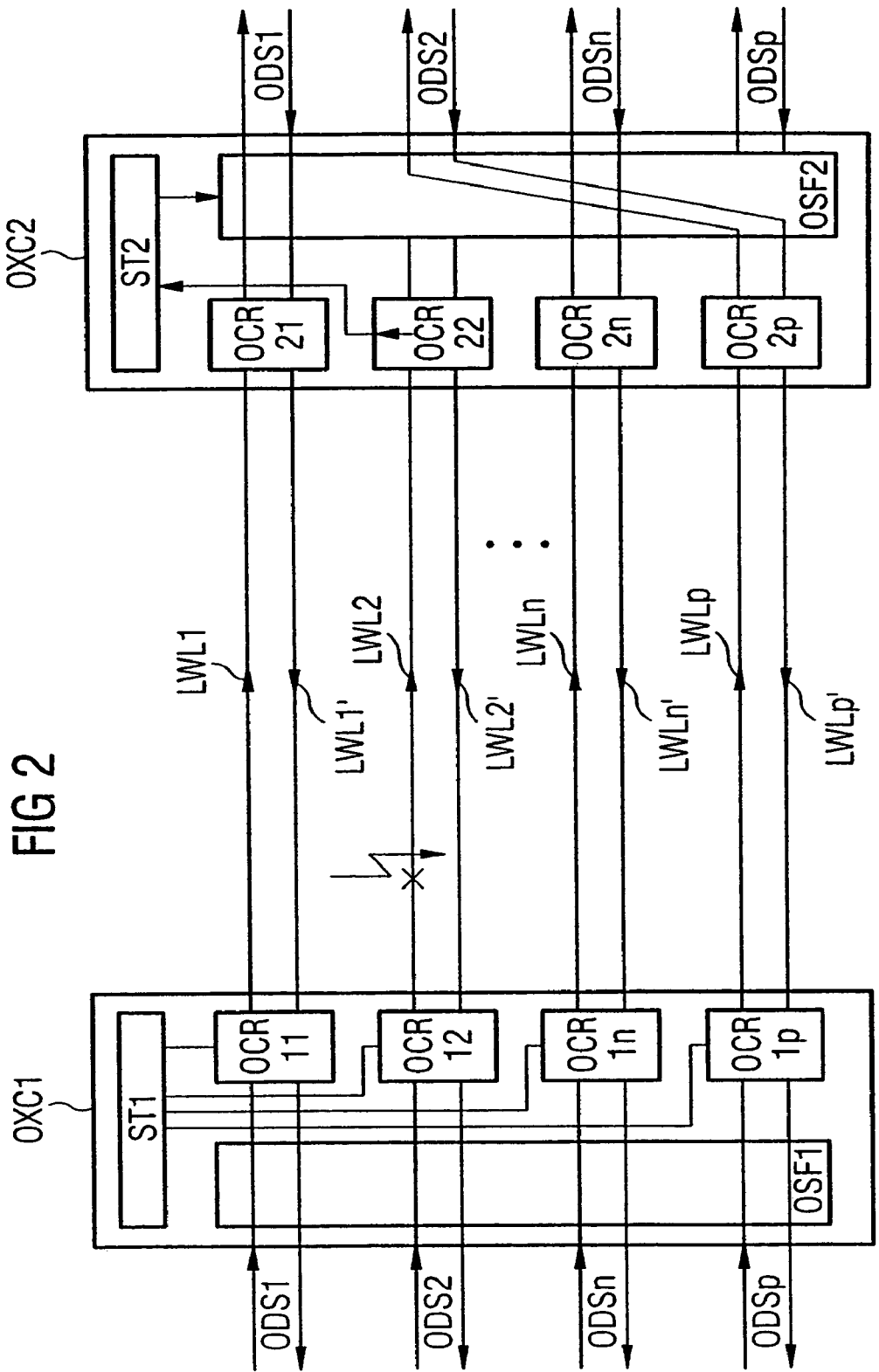
FIG. 2 shows the block diagram according to FIG. 1 in the case of the occurrence of a fault and of a first switching state.
Figure 3:
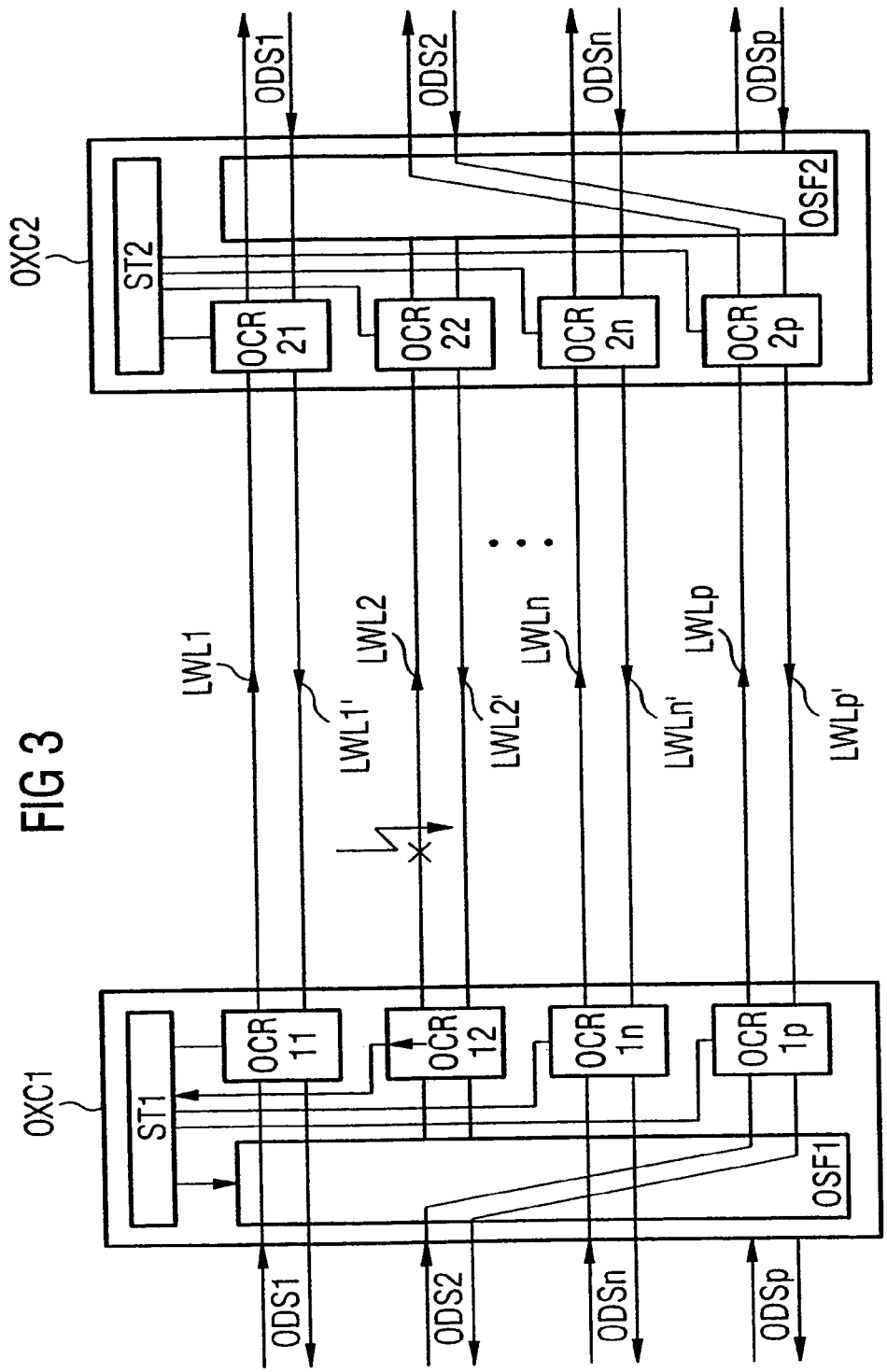
FIG. 3 shows the block diagram according to FIG. 2 in the case of the occurrence of a fault and complete switch over to a stand-by line.

FIG. 2 shows the arrangement according to FIG. 1, with the provision that interference has occurred in one of the operational optical conductors, because, for example, the optical conductor LWL2 has been interrupted, illustrated by an X. For this reason, no optical signal is detected in the transmitting direction by the receiving optical switching device OXC2. The direction from OXC1 to OXC2 is interrupted in the case shown. In other words, initially, only the optical switching device OXC2 does not receive a signal. This is detected in the assigned monitoring device OCR22 as a signal failure, termed loss of light, LOL for short, or alarm indication signal, AIS for short. The monitoring device OCR22 thereupon outputs a signal to the control device ST2. The control device ST2 evaluates this signal and outputs a switching command to the optical switchpanel OSF2. The optical switchpanel OSF2 evaluates this command and switches over the optical data signal ODS2 bi-directionally from the pair of operational optical conductors LWL2/ LWL2' to the stand-by pair of optical conductors LWLp/ LWLp'. Bi-directional switch over is carried out although the transmission is not disturbed in the opposite direction, i.e., from OXC2 to OXC1. Because of the bi-directional switchover in the optical switching device OXC2, no signal is emitted on the optical conductor LWL2', which is not disturbed per se. The optical switching device OXC1 thereupon does not receive a signal. This is detected in the assigned monitoring device OCR12 as a signal failure, LOL or AIS. The assigned monitoring device OCR12 outputs a signal to the control device ST1. The control device ST1 evaluates this signal and outputs a switching command to the optical switch panel OSF1. The optical switch panel OSF1 evaluates this command and carries out a bi-directional switchover of the optical data signal ODS2 from the pair of operational optical conductors LWL2/LWL2' to the stand-by pair of optical conductors LWLp/LWLp'. This switching state is illustrated in FIG. 3. A stand-by switching of the optical data signal for a line interruption of an optical conductor is thereby carried out (1:n stand-by switching).

For the case in which an additional optical data signal has been transmitted on the stand-by pair of optical conductors LWLp/LWLp' in the fault-free case, this signal will no longer be transmitted by the stand-by switching (low priority traffic).

Switchover to the pair of operational optical conductors is to be performed as synchronously as possible after the defective optical conductor has been repaired. In order to achieve this, a special switching command is used in which the optical switching system is brought at one end into a type of wait condition. After a compulsory switchover at the other end, a quasi-synchronous switchover is then performed at the waiting end.

In the case when a plurality of optical conductors are interrupted, switchover is performed according to previously stipulated priorities or criteria defined in some other way, such as time windows.

The invention describes a method with the aid of which it is possible to implement a 1:n stand-by switching, without using an overhead or additional channels. Features of the method may include the following basic principles.

Both the receiving direction and the transmitting direction are switched to stand-by upon detection of a failure of the operating signal. As a result, in the case of a fault in only one direction, a fault is also caused in the opposite direction. Consequently, faults are always detected at both ends, and stand-by switching is carried out in each case.

In order to prevent erroneous connections of relatively long duration in the case of competing multiple faults, it can be desirable that the operational data signal that first failed be switched to stand-by.

Quasi-simultaneous multiple faults can have the effect that one end considers one failure to be the first failure, and the other end considers the other failure to be the first failure. Quasi-simultaneous multiple faults almost always have a common fault cause. Quasi-simultaneous faults can be recognized as such by the introduction of fault persistence checking, for example, in the range of seconds. In this case, the two ends do not switch to stand-by the operational data signal to stand-by for which they have first detected the fault, but rather the operational data signal with the lower channel number is switched to stand-by.

Failures of operational data signals with a cause outside the 1:n stand-by switching system cannot be distinguished by the end detecting the fault from those whose cause lies within the stand-by switching system. A switch is made to stand-by to the extent that the stand-by data link is not already occupied by another operational data signal. This has no significant negative effects, because the network management system can locate the fault cause through its global view, and can switch the operational data signal unnecessarily switched to stand-by back to the associated operational data link by means of appropriate switching commands to the optical switching devices OXC1 and OXC2. The stand-by data link is therefore occupied only for a short time in the event of faults from outside the system.

The network management system can determine by means of its global view when the operational data link is itself functional again after a failure. In order to permit switching back that is quasi-synchronous, the network management system may not simply send appropriate switching commands to the two optical switching devices OXC1 and OXC2. The commands would typically not arrive simultaneously, because of the slow data network. The consequence would be interruptions in the operational data signal, for example, in the range of seconds. Instead, the network management system first sends to one of the two optical switching devices OXC the command to prepare itself to switch back, that is to say the optical switching device OXC is to switch back immediately to the operational data link as soon as it no longer detects faults. The network management system then sends the command to switch back to the other optical switching device OXC. This mechanism has the effect that the two ends are switched back in a quasi-synchronous fashion.

Both optical switching devices OXC carry out a continuous plausibility test with reference to the current fault state and stand-by switching state of the 1:n stand-by switching system. In the case of inconsistencies that last longer than the maximum stand-by switching duration of 50 ms, there is an automatic switch back to the initial state and the network management system is informed thereof.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

What is claimed is:

1. A method for protecting data signals comprising:
    transmitting the data signals bi-directionally between first and second optical switching devices via at least two operational optical conductor sets each including first and second optical conductor;
    determining a data signal interference in a failed operational optical conductor of one of the at least two operational optical conductor sets in a receiving device of the first optical switching device;
    switching the data signals from the failed operational optical conductor of the one of the at least two sets of operational optical conductors in which failure is determined to a stand-by optical conductor set in the first optical switching device;
    determining a data signal failure, due to the switching of the data signals, in the second operational optical conductor of the failed operational optical conductor set, with the second optical switching device and switching the data signal of the failed operational optical conductor set in the second optical switching device to the stand-by optical conductor set;
    transmitting the data signal bi-directionally between the first and second optical switching devices via the stand-by optical conductor set; and
    switching the data signals of the failed operational optical conductor set to the stand-by optical conductor set according to an allocated priority in the event of an interference failure of a plurality of the at least two sets operational optical conductor sets connected to the first and second optical switching devices.

2. The method as claimed in claim 1, wherein each operation optical conductor set comprises a pair of optical operational conductors.

3. The method as claimed in claim 2, further comprising: allocating priority as a function of a temporal occurrence of the interference in the respective operational optical conductor set.

4. The method as claimed in claim 2, further comprising:
switching the switched data signals from the stand-by optical conductor set to an original at least two operational optical conductors that is once again functional by switching the data signals at one of the first and second optical switching devices to the original at least two operational optical conductors and subsequently and quasi-synchronously switching the data signals at the other of the first and second optical switching devices to the original at least two operational optical conductors.

5. The method as claimed in claim 1, wherein transmitting the data signals bi-directionally between first and second optical switching devices via at least two operational optical conductors further includes transmitting the data signals via a plurality of optical conductors sets.

6. The method as claimed in claim 1, further comprising:
allocating priority as a function of a temporal occurrence of the interference in the respective operational optical conductor sets.

7. The method as claimed in claim 6, further comprising:
switching the switched data signals from the stand-by optical conductor set to an original operational optical conductor set of the at least two operational optical conductor sets that is once again functional by switching the data signals at one of the first and second optical switching devices to the original operational optical conductor set and subsequently and quasi-synchronously switching the data signals at the other of the first and second optical switching devices to the original operational optical conductor set.

8. The method as claimed in claim 1, further comprising:
switching the switched data signals from the stand-by optical conductor set to an original operational optical conductor set of the at least two operational optical conductor sets that is once again functional by switching the data signals at one of the first and second optical switching devices to the original operational optical conductor set and subsequently and quasi-synchronously switching the data signals at the other of the first and second optical switching devices to the original operational optical conductor set.

9. The method as claimed in claim 1, wherein each operational optical conductor set comprises an individual bi-directional optical conductor.

* * * * *